April 21, 1959     H. SINCLAIR     2,882,683
HYDRAULIC TURBO COUPLINGS
Filed Sept. 15, 1955     4 Sheets-Sheet 1

INVENTOR
Harold Sinclair
BY
Benjamin Sweedler
ATTORNEY

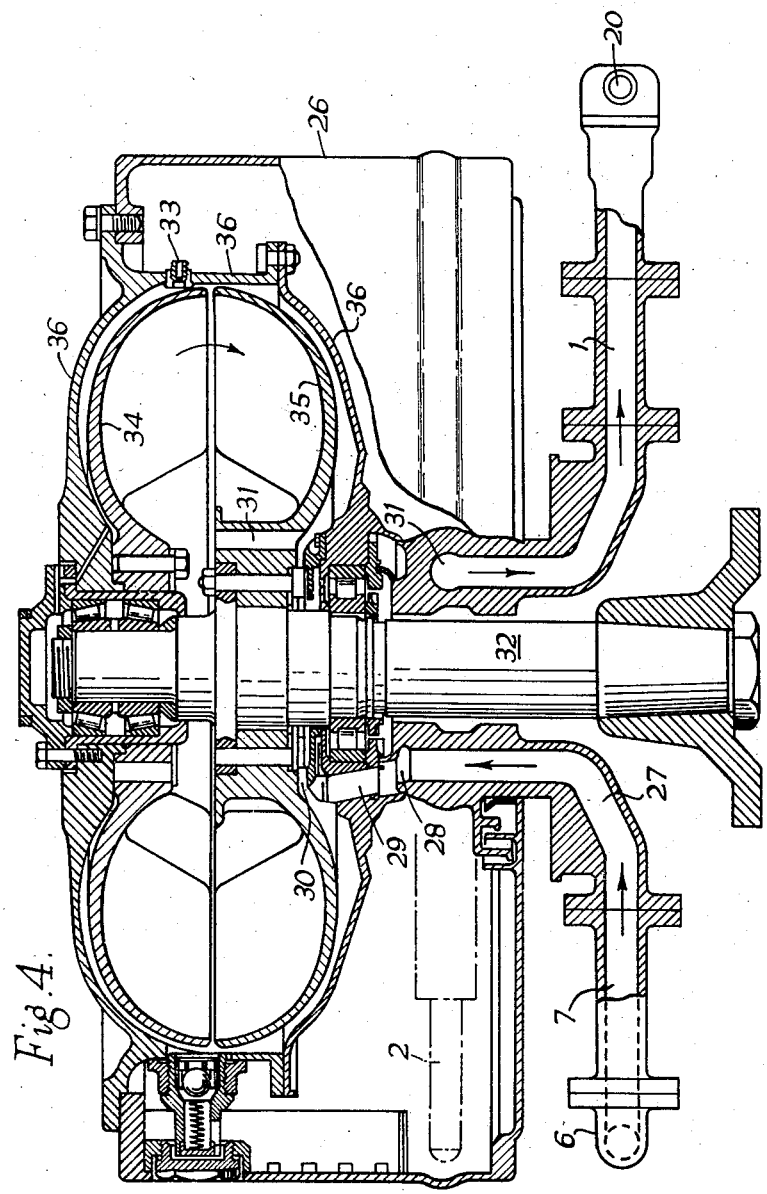

United States Patent Office 2,882,683
Patented Apr. 21, 1959

2,882,683

HYDRAULIC TURBO COUPLINGS

Harold Sinclair, Windsor, England

Application September 15, 1955, Serial No. 534,563

Claims priority, application Great Britain October 25, 1954

6 Claims. (Cl. 60—54)

This invention relates to hydraulic turbo couplings of the type that have vaned impeller and runner elements and are provided with an adjustable scoop tube for varying the degree of filling of the working circuit with working liquid and so varying the torque transmitting capacity of the coupling.

Normally the adjustment of the scoop tube to the required position is effected manually.

In the case of large couplings intended for the transmission of high torque, as for example in geared diesel engine driven marine propulsion machinery, adjustment of the scoop tube requires considerable exertion on the part of the operator, and it is an object of the invention to provide a power operated means for effecting the required adjustment.

In accordance with the invention a fluid-pressure operated servo mechanism is provided for adjusting the position of the scoop tube, said servo mechanism including a servo motor and a controllable distributing valve and making use of fluid pressure derived from engagement of the scoop tube with working liquid.

In a preferred form of the invention the fluid pressure for operating the servo motor is derived from a duct by which working liquid flows from the scoop tube, and a valve is provided which operates automatically to restrict the flow in said duct and increase the pressure therein, in response to said distributing valve being operated to retract the scoop tube.

Figure 1:
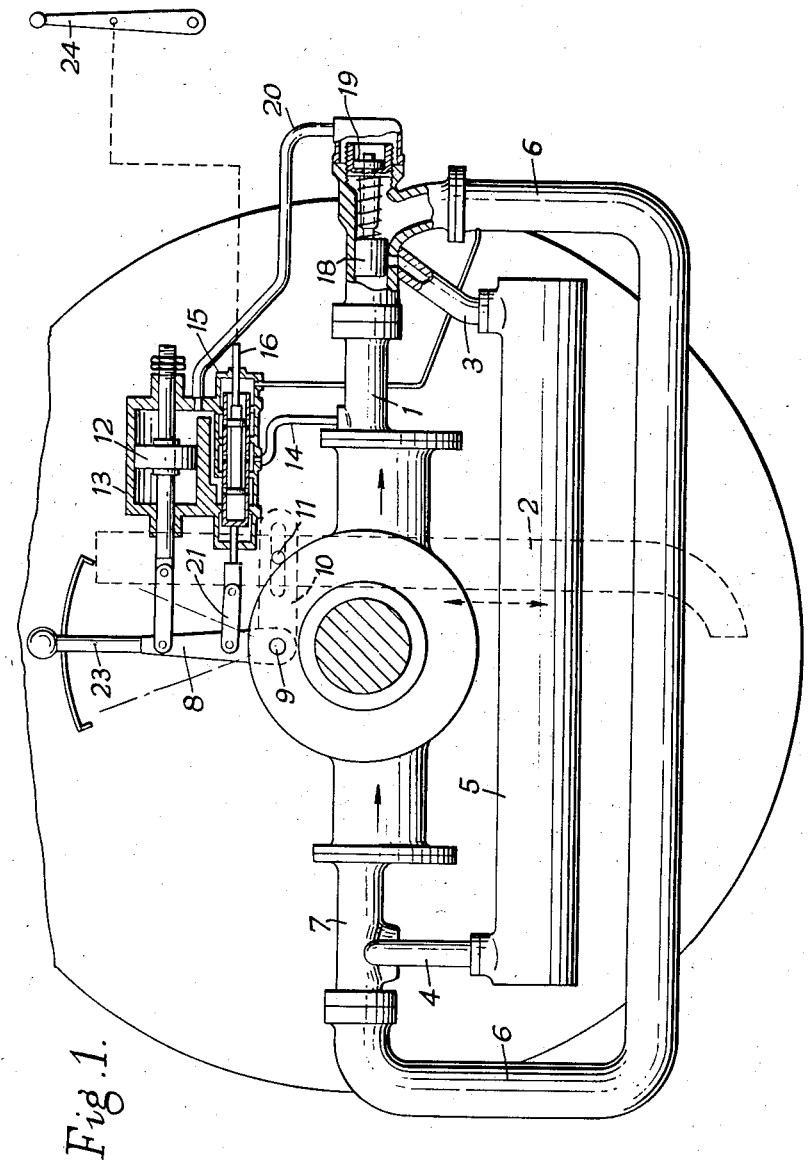
Figure 2:
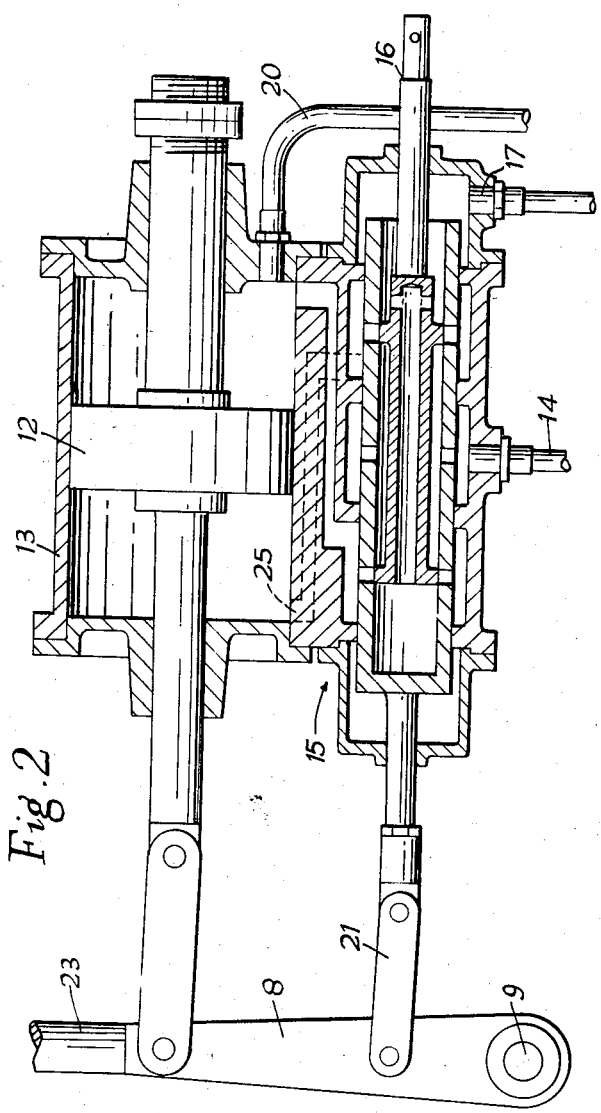
Figure 3:
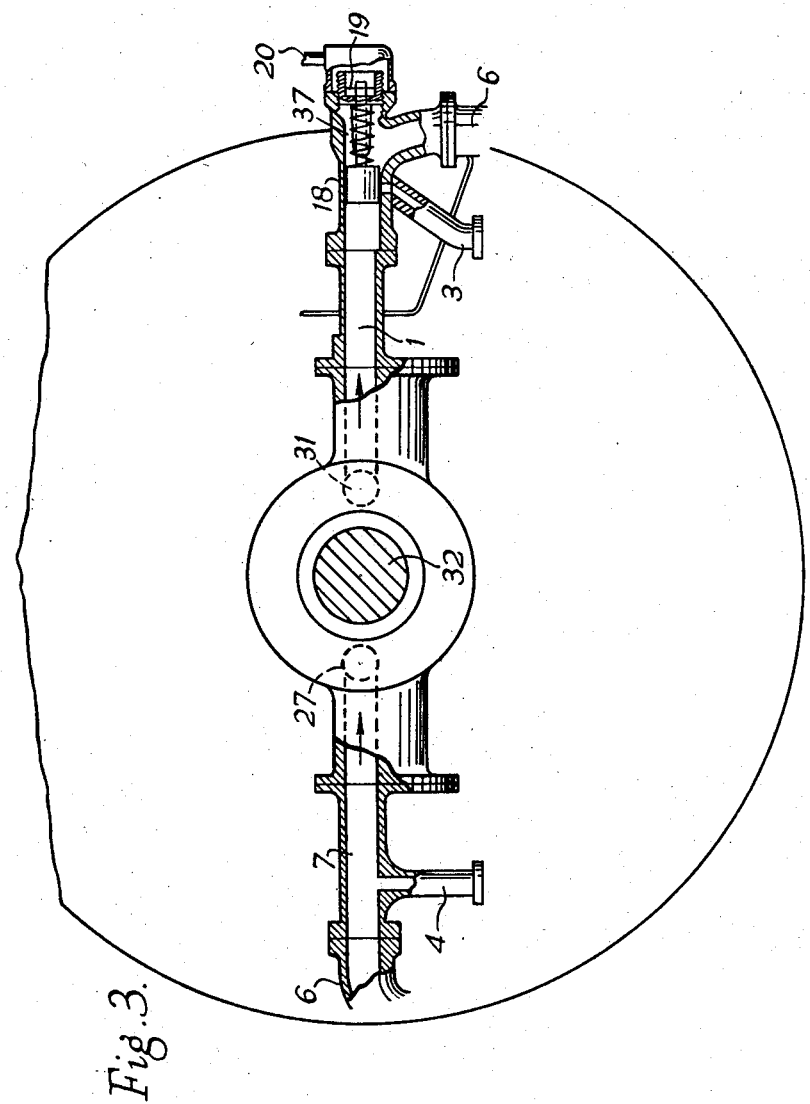

In order that the invention may be clearly understood and readily carried into effect it will now be described in more detail with reference to the accompanying drawing, in which Figure 1 is an end view, partly in section, of a hydraulic turbo coupling embodying the invention, Fig. 2 shows the servo motor and distributing valve on a larger scale, Fig. 3 is a part-sectional elevation of part of the turbo coupling shown in Fig. 1 and Fig. 4 is a view in cross-section of the coupling, taken on a horizontal plane through the axis of rotation of the coupling.

The hydraulic turbo coupling illustrated is of the type that is provided with a sliding scoop tube serving to transfer working liquid from a reservoir chamber 26 rotatable with a vaned element of the coupling to the working chamber of the coupling, the working chamber being provided with restricted leak-off nozzles through which in the operation of the coupling working liquid flows out of the working chamber and into the reservoir chamber. Couplings of this type are described for example in United States Patents Nos. 2,187,667 and 2,264,341.

Referring to Fig. 4 of the drawings, the coupling comprises a casing 36 to which the prime mover may be connected, casing 36 constituting a working chamber and enclosing a vaned impeller 34 and a vaned runner 35, the runner 35 being fixed on an output shaft 32 journalled in the casing 36 and in the hub of the impeller 34, which is rotatable with casing 36. The casing 36 is provided with leak-off nozzles, one of which is shown at 33, via which, in the operation of the couplings, working liquid leaks from the casing 36 to a reservoir chamber 26 which is rotatable with the casing 36 and impeller 34. The liquid in the reservoir chamber 26 forms a rotating ring into which the scoop orifice of the scoop tube 2 extends, so that working liquid is continuously picked up by the scoop tube 2 and transferred via an outlet duct 31 to duct 1, cooler 5, pipe 6 to return duct 7.

The working liquid in duct 7 passes into a duct 27 and thence through a port 28 and duct 29 to the annular space 30, whence it passes via ducts, one of which is shown at 31', back into the working circuit.

As shown in Fig. 1 duct 1 connects the outlet of the scoop tube 2 to a pipe 6, and the duct 7 connects the pipe 6 to the liquid inlet port leading to the working circuit of the coupling. Branch pipes 3 and 4 are connected to a cooler 5, through which oil circulation takes place, a spring loaded valve 18 being provided to restrict the flow from duct 1 to pipe 6 during normal operation of the coupling and thereby to ensure that the main circulation takes place through the cooler.

Under conditions when the scoop tube is engaged quickly so as to effect rapid filling of the working circuit the rise of pressure in duct 1 causes the valve 18 to open automatically and thus to permit of increased flow of liquid into the filling duct 7 through pipe 6 in addition to the path provided by cooler 5.

The scoop tube 2 is provided with a control lever 8 that is pivotally mounted at 9 on a stationary part of the coupling and is operatively connected with a slotted lever 10 that co-operates with a pin 11 to actuate the scoop tube 2. The lever 8 is coupled to the piston 12 in an oil servo cylinder 13. A pipe 14 branched from the above-mentioned duct 1 leads to a distributing valve 15 provided with a control spindle 16 connected to a control lever 24. By suitably setting the control spindle 16, the distributing valve 15 can be set selectively to put the branch pipe 14 in communication with one side or other of the piston 12 in the servo cylinder 13, and to put the opposite side of the said piston 12 simultaneously in communication with an exhaust port 17 communicating via pipe 6 with the inlet duct 7. The control lever of the distributing valve 15 may be manually operated, or it may, for example, be coupled to the fuel control lever of an engine with which the coupling is associated.

The scoop tube 2 is arranged with its longitudinal axis substantially vertical and with its scoop orifice downwards (as shown), so that the weight of the scoop tube 2 biases it to its lowermost position, i.e. in the direction for insertion of the scoop orifice into the working liquid, which when the coupling is operating forms into a ring which rotates with the reservoir chamber 26. According to the setting of the spindle 16 of the distributing valve 15, the pressure of the working liquid in the pipe 1 leading from the scoop tube outlet can be applied via the pipe 14 to one side of the piston 12 to retract the scoop tube 2 from the ring of working liquid or to the other side of the piston 12 to assist the scoop tube 2 in moving under the action of gravity into the ring of working liquid.

The valve 18 loaded by a spring 37 is provided with a piston 19 which, when the distributing valve 15 is operated to withdraw the scoop tube 2, by admitting oil to the cylinder 13 at the right-hand side of piston 12 is subjected to liquid pressure via a pipe 20 so that the loading of the valve 18 is increased and the valve 18 restricts or stops the discharge of oil from the duct 1, thereby providing increased pressure, in the pipe 14, for operating the servo motor to retract the scoop tube.

In the converse direction of movement of the scoop tube, viz.: when the scoop tube is inserted, the pressure in the duct 14 will increase due to the deeper engagement of the scoop tip with the said ring of liquid, and to avoid an unduly fast rate of such scoop movement the port 25 (shown in dotted lines) for admitting liquid to the left hand side of the piston 12 may be suitably restricted in size.

The distributing valve 15 is connected to lever 8 by a link 21 whereby to provide follow-up gear such that any desired setting of the scoop tube 2, with a corresponding filling of the working circuit, can be obtained by an appropriate setting of the distributing valve control lever. Manual scoop actuating gear such as an extension 23 of the lever 8 may be provided as a means of setting the scoop tube position when the coupling is not in operation and hence liquid under pressure from the scoop system is not available to operate the servo motor.

With the arrangement described there is no source of liquid under pressure to operate the servo motor and scoop tube when the turbo coupling is stationary, but immediately the driving engine is started the liquid pressure created in the scoop tube (which will be in the fully engaged position) will be available to adjust the setting of the scoop tube in accordance with the position of the control spindle 16.

Fig. 1 shows a single ended scoop tube suitable for use with a unidirectional engine, e.g. driving through a reverse reduction gear. In the case where the engine is of the direct reversing type, a scoop tube having oppositely directed scoop orifices would be provided as is normal practice with reversing engines. When the engine is momentarily stopped in the course of reversal the scoop tube will, if it is in a retracted position, momentarily move downwards, and then be returned to the set position when the engine is restarted and liquid pressure is again created within the scoop tube to actuate the servo motor.

I claim:

1. A hydraulic turbo coupling comprising vaned impeller and runner elements within a working chamber, a scoop chamber communicating with said working chamber and containing a rotating ring of working liquid when the coupling is in operation, an adjustable scoop tube in said scoop chamber for varying the degree of filling of said working chamber by removing liquid from said ring, a duct which communicates with liquid circulating through said turbo coupling when it is in operation, a servo motor operated by liquid pressure derived from said duct for adjusting the scoop tube and a distributing valve operable independently of the impeller speed to control the feeding to said servo motor of the liquid pressure in said duct.

2. A hydraulic turbo coupling comprising vaned impeller and runner elements and casing forming a working chamber, a reservoir rotatable with one of said elements and in restricted communication with said working chamber, an adjustable scoop tube with a scoop orifice disposed in said reservoir, a duct connecting said scoop tube to said working chamber, power means for adjusting said scoop tube, said power means comprising a servo motor coupled to said scoop tube and operated by liquid pressure derived from said duct, and a distributing valve communicating with said duct and operable independently of the impeller speed to control the feeding to said servo motor of the liquid pressure in said duct.

3. A hydraulic turbo coupling comprising vaned impeller and runner elements within a working chamber, a scoop chamber communicating with said working chamber and containing a rotating ring of working liquid when the coupling is in operation, an adjustable scoop tube in said scoop chamber for varying the degree of filling of said working chamber by removing liquid from said ring, a duct which communicates with said scoop tube and through which liquid removed from said ring flows away from said scoop tube, a servo motor operated by liquid pressure derived from said duct for adjusting the scoop tube, a distributing valve operable to control the feeding to said servo motor of the liquid pressure in said duct, a flow control valve in said duct for controlling the flow of liquid through said duct, a spring that biases said valve to a position to restrict the flow through said valve, a piston coupled to said flow control valve, and means for applying to said piston, in amplification of the force of said spring, the liquid pressure employed in said servo motor for adjusting said scoop tube in the direction to decrease the degree of filling of the working chamber of the coupling.

4. A hydraulic turbo coupling comprising vaned impeller and runner elements within a working chamber, a scoop chamber communicating with said working chamber and containing a rotating ring of working liquid when the coupling is in operation, an adjustable scoop tube in said scoop chamber for varying the degree of filling of said working chamber by removing liquid from said ring, a first duct which communicates with said scoop tube and through which liquid removed from said ring flows away from said scoop tube, a servo motor for adjusting said scoop tube, said servo motor being operated by liquid pressure derived from said duct, the coupling including a distributing valve operable to control the feeding to said servo motor of the liquid pressure in said first duct, a second duct providing communication between said first duct and said distributing valve, and flow-restricting means situated in said first duct downstream of said second duct to create in said second duct at least sufficient pressure to operate said servo motor.

5. A hydraulic turbo coupling according to claim 4, wherein said flow-restricting means are constituted by a valve and a spring biasing said valve to a position to decrease the flow in said first duct and increase the pressure in said second duct, a piston coupled to said valve, and means for applying to said piston in amplification of the force of said spring the liquid pressure employed in said servo motor for adjusting said scoop in the direction to decrease the degree of filling of the working chamber of the coupling.

6. A hydraulic turbo coupling comprising vaned impeller and runner elements within a working chamber, a scoop chamber communicating with said working chamber and containing a rotating ring of working liquid when the coupling is in operation, an adjustable scoop tube in said scoop chamber for varying the degree of filling of said working chamber by removing liquid from said ring, said scoop tube being biased in the direction of increasing the filling of said working chamber, a first duct which communicates with said scoop tube and through which liquid removed from said ring flows away from said scoop tube, a servo motor operated by liquid pressure derived from said first duct for adjusting said scoop tube, a distributing valve operable to control the feeding to said servo motor of the liquid pressure in said first duct, a second duct interconnecting said first duct and said distributing valve, and flow-restricting means disposed in said first duct downstream with respect to said second duct for creating in said second duct at least sufficient pressure to operate the servo motor in the direction for moving the scoop tube in the direction to decrease the degree of filling of said working chamber.

References Cited in the file of this patent

UNITED STATES PATENTS

| 2,187,667 | Sinclair et al. | Jan. 16, 1940 |
| 2,264,341 | Sinclair et al. | Dec. 2, 1941 |
| 2,299,049 | Ziebolz | Oct. 13, 1942 |
| 2,563,823 | Kerfoot | Aug. 14, 1951 |

FOREIGN PATENTS

| 1,093,556 | France | Nov. 24, 1954 |